(12) United States Patent
Hoffmann

(10) Patent No.: US 9,639,587 B2
(45) Date of Patent: May 2, 2017

(54) SOCIAL NETWORK ANALYZER

(71) Applicant: SAP SE, Walldorf (DE)

(72) Inventor: Florian Hoffmann, Schwetzingen (DE)

(73) Assignee: SAP SE, Walldorf (DE)

( * ) Notice: Subject to any disclaimer, the term of this patent is extended or adjusted under 35 U.S.C. 154(b) by 452 days.

(21) Appl. No.: 13/713,533

(22) Filed: Dec. 13, 2012

(65) Prior Publication Data

US 2014/0172826 A1   Jun. 19, 2014

(51) Int. Cl.
*G06F 17/30* (2006.01)

(52) U.S. Cl.
CPC .............................. *G06F 17/30572* (2013.01)

(58) Field of Classification Search
CPC ................................................ G06F 17/30572
USPC .................................................. 707/605, 805
See application file for complete search history.

(56) References Cited

U.S. PATENT DOCUMENTS

| | | | | | |
|---|---|---|---|---|---|
| 5,495,605 | A | * | 2/1996 | Cadot | G06F 17/30398 |
| 5,546,529 | A | * | 8/1996 | Bowers et al. | 715/848 |
| 5,630,120 | A | * | 5/1997 | Vachey | G06F 17/30398 |
| 6,714,936 | B1 | * | 3/2004 | Nevin, III | G06F 17/30395 |
| 8,874,601 | B2 | * | 10/2014 | Hermanns et al. | 707/763 |
| 2003/0142669 | A1 | * | 7/2003 | Kubota | H04L 45/00 370/389 |
| 2006/0123337 | A1 | * | 6/2006 | Koinuma | G06F 17/3089 715/234 |
| 2006/0242606 | A1 | * | 10/2006 | Lin | G06F 8/34 715/855 |
| 2009/0106234 | A1 | * | 4/2009 | Siedlecki et al. | 707/5 |
| 2010/0058118 | A1 | * | 3/2010 | Yamaoka | 714/48 |
| 2014/0081894 | A1 | * | 3/2014 | Heidasch | G06F 17/30864 706/25 |
| 2014/0129936 | A1 | * | 5/2014 | Richards | G06F 21/6218 715/716 |
| 2014/0304214 | A1 | * | 10/2014 | Sakunkoo | G06N 5/022 706/55 |

* cited by examiner

*Primary Examiner* — Baoquoc N To
(74) *Attorney, Agent, or Firm* — Jones Day

(57) ABSTRACT

A system and method are described herein that provide for visualizing business objects stored in a backend system in database model views for display as nodes in a user interface. Business objects are retrieved from the backend system, with metadata from the business objects being customized and sorted into a plurality of node types. Each business object may be displayed in a user interface as a node along with other nodes generated from the database model views. The nodes represented by the business objects may be connected by edges that provide for an interconnection between each of the nodes. The edges may be customized by providing directional components to the edges to demonstrate the relationship between the displayed nodes.

20 Claims, 6 Drawing Sheets

| HANA VIEW 1 | | |
|---|---|---|
| STYLE | ID1 | LABEL |
| CHAR 15 | CHAR 40 | CHAR 60 |
| STYLE_A | 00001 | Node 1 |
| STYLE_B | 00002 | Node 2 |
| STYLE_C | 00003 | Node 3 |
| ... | ... | ... |

100.1 Graphical Calculation View

| HANA VIEW 2 | | |
|---|---|---|
| STYLE | ID1 | LABEL |
| CHAR 15 | CHAR 40 | CHAR 60 |
| STYLE_D | 00001 | 00001 |
| STYLE_E | 00002 | 00002 |
| STYLE_F | 00003 | 00003 |
| ... | ... | ... |

100.2 Attribute View

| HANA VIEW 3 | | |
|---|---|---|
| STYLE | ID1 | LABEL |
| CHAR 15 | CHAR 40 | CHAR 60 |
| STYLE_G | 00001 | Node 1 |
| STYLE_H | 00002 | Node 2 |
| STYLE_I | 00003 | Node 3 |
| ... | ... | ... |

100.3 Scripted Calculation View

Figure 4

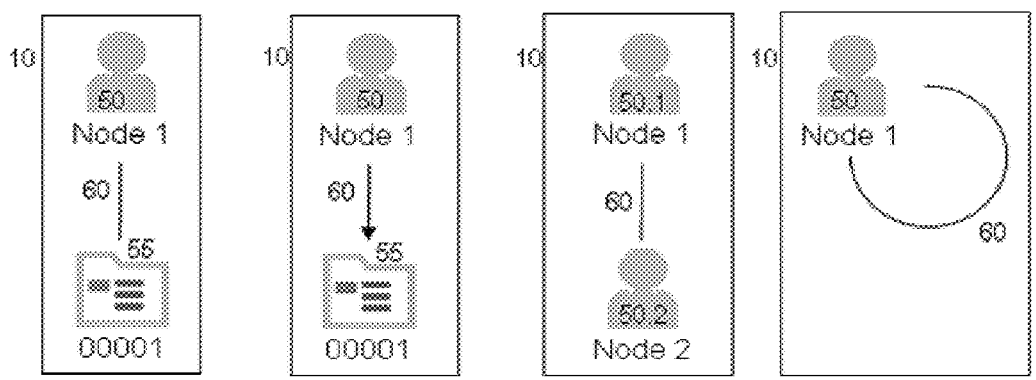

SOCIAL NETWORK ANALYZER

BACKGROUND INFORMATION

Business software allows for implementing business processes by modeling business data as business objects with data exchange between the objects. The business data provided via the business objects can be accessed through mechanisms such as graphical user interfaces, forms, and analytical reports. Traditionally, user interfaces provide access to information about the business objects themselves but conveyed limited information about the potential association between otherwise seemingly unrelated business objects. In industries, for example, such as fraud investigation where there is a need to determine relationships between business objects to prevent fraudulent business transactions, the inability to identify potential existing relationships creates a large void in the business software in protecting against fraud.

First, existing business software is restricted in the ability to both visualize business objects and analyze the relationships between the business objects in a graphical display. Such software is also restrictive in the ability to communicate with a backend server where the business objects are retrieved and visualize the business objects in graphical views, where relationships between the business objects may also be displayed and analyzed in the graphical view.

Second, existing business software is restricted in the ability to interpret the relationships between business objects without previously replicating and transforming their data and metadata to another database or data structures designated for the purpose. Disadvantages of such a replication and transformation process include the loss of real-time analysis capability due to the replication delay, the increased need for storage capacity for the replicated data, and the higher effort for maintaining the replication service.

Third, existing business software is restricted in the ability to abstract new business objects and relations from existing data. Defining new business objects and relations from existing ones is either not possible at all or requires adding code to the business software or modifying its resources. Such enhancements or modifications, where possible, are difficult and expensive due to the required technical expertise.

Thus, there remains a need in the art for a system for visualizing business objects from their original data stored in a backend system and rendered in a graphical view where the relationships between the business objects may be defined. There also remains a need in the art to integrate business objects in a graphical display to quickly identify the relationship between the business objects.

SUMMARY

A system and method are described herein that provide for visualizing business objects stored in a backend system in customizable database model views for display as nodes in a user interface. Business objects are retrieved from the backend system, with metadata from the business objects being customized and sorted into a plurality of node types. Each business object may be displayed in a user interface as a node along with other nodes generated from the database model views. The nodes represented by the business objects may be connected by edges that provide for an interconnection between each of the nodes. The edges may be customized by providing directional components to the edges to demonstrate the relationship between the displayed nodes.

In particular, the exemplary embodiments and/or exemplary methods are directed to a system and method for visually defining relationships between business objects stored in a backend system in a user interface of a device. The system and method include a device that executes an application that retrieves the business objects stored in the backend system and sorts metadata of the business objects into node types. A database model view, in particular a HANA view, may depict the metadata of the business objects in a table or similar representation. This HANA view may be one of a number of view types, including a graphical calculation view, an attribute view, and a scripted calculation view. Nodes may be generated from database model views of the metadata of the business objects, with each row of a database model view corresponding to a separate node having its own node label and unique key(s) to identify the node. Additional database model views may be used to generate nodes corresponding to different node types. The nodes may be displayed as visual representations in the user interface along with their corresponding node label. Nodes of each node type may have a distinct visual representation from nodes of a different node type.

The system may also use other database model views for the generation of edges, which may be visually depicted as line markers or arrows to connect the nodes. This database model view may identify at least one source node for the start of each edge and at least one target node for the termination of each edge. The edges may be generated from this database model view, which may also be a HANA view corresponding to any of a number of view types. Upon generation, visual representation of the edges may be displayed in the user interface based on the source node and the target node of each node. The source node and the target node may be the same node type, even the same node, or different node types. The system may be enabled to depict the direction of the edge visually in the user interface.

The database model views for both nodes and edges, may access the original data of the business objects. The data may be transformed transiently to the structure described above, optimized for graph display, thus avoiding the need to replicate the data before visualizing it. The database model views may also involve technology beyond the simple transformation of the data. Joining and grouping may be used to recombine multiple business objects into a single new abstract business object, for example to merge a group of business partners into a single node.

Furthermore, HANA views natively provide statistics and pattern recognition functionality which may be incorporated into the views to classify the data whilst being provided. Transient classification of nodes may be used, for example, to vary their visual appearance based on the business object data. Transient classification of edges may be used, for example, to display edges that represent the similarity of objects or which link them to nodes representing categories.

BRIEF DESCRIPTION OF THE DRAWINGS

FIG. 4 is a diagram of different model view types of the business objects that may be provided by the database in the backend system according to an embodiment.

FIG. 6(a)-(d) are diagrams of the connectivity between nodes and generated edges as displayed in the user interface of the client device according to an embodiment.

DETAILED DESCRIPTION

The subject matter will now be described in detail for specific preferred embodiments, it being understood that these embodiments are intended only as illustrative examples and is not to be limited thereto these embodiments.

Embodiments may discuss a system and method for visualizing business objects stored in a backend system in HANA views for display as nodes in a user interface. Business objects are retrieved from the backend system, with metadata from the business objects being customized and sorted into a plurality of node types. Each business object may be displayed in a user interface as a node along with other nodes generated from one or more HANA views. The nodes represented by the business objects may be connected by edges that provide for an interconnection between each of the nodes. The edges may be customized by providing directional components to the edges to demonstrate the relationship between the displayed nodes.

Figure 1:
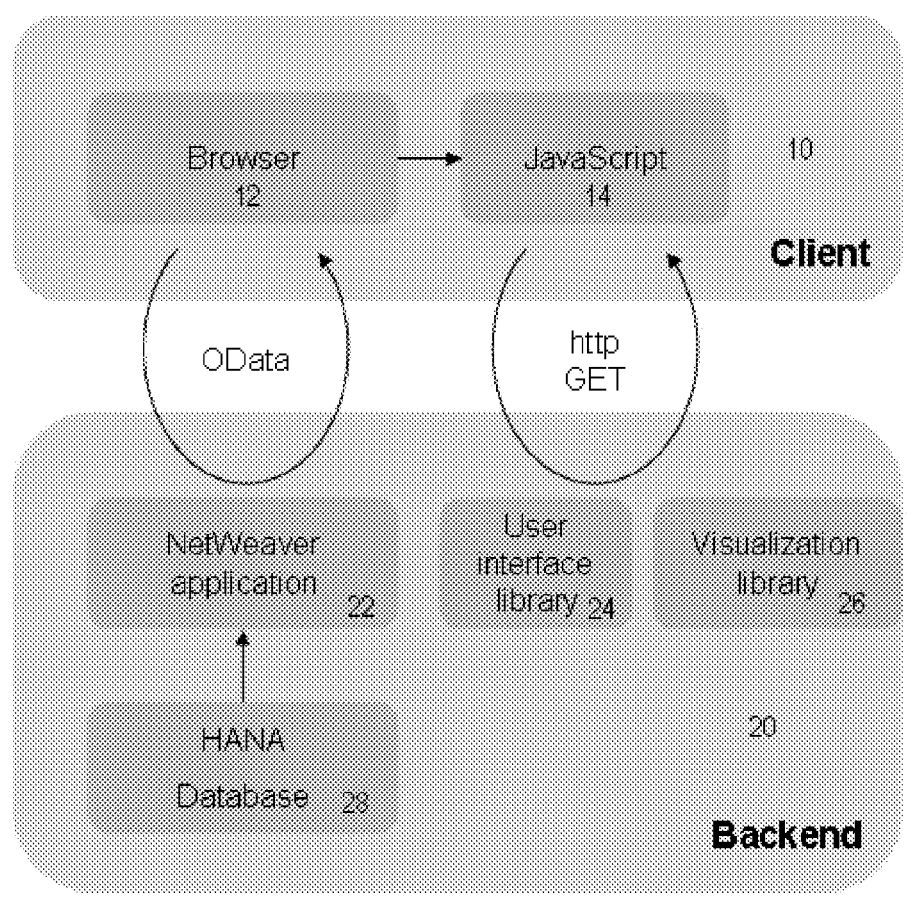
FIG. 1 is a diagram of an architecture of the system for retrieving the business objects from a backend system for the social network analyzer according to an embodiment.

FIG. 1 illustrates an architecture of the system for retrieving the business objects from a backend system for the social network analyzer according to an embodiment. Client device 10 may run an application to view, create, or modify the retrieved business objects. In an embodiment, device 10 may be implemented as a desktop computer, laptop computer, tablet, client computer, centralized computer in a workstation or other computer, hand-held device, personal digital assistant (PDA), television set-top Internet appliance, mobile telephone, smart phone, Android™ device, iPod™, iPhone™, iPad™, etc., or as a combination of one or more thereof, or other comparable device. An application displaying the visual representation of the business objects may be implemented in browser 12 on device 10 through, for example, Javascript 14. In other embodiments, the application may be implemented using other scripting languages in browser 12. In alternate embodiments, the application may be implemented as a standalone application.

Client device 10 may connect to backend computer systems or networks 20 to retrieve new or updated business objects. The business objects may be stored as metadata in one or more databases in the backend system 20. Backend system 20 may be implemented through specific server component hardware and one or more networks. In an embodiment, backend system 20 may include a platform to translate the business objects to a data protocol, such as OData format, for transmission from the backend system 20 to client device 10.

Backend system 20 may include a server and may provide business data, including the business objects. Client device 10 may interact with the backend system to obtain new business objects and retrieve any updated business objects. In an embodiment, backend system 20 may contain a processor, memory, and an input/output interface, all of which may be interconnected via a system bus. Backend system 20 may also include one or more databases 28 also connected to the system bus. In various embodiments, backend system 20 may have an architecture with modular hardware or software systems that include additional systems communicating through one or more networks. The modular design may enable a business to add, exchange, and upgrade systems, including using systems from different vendors in some embodiments.

In an embodiment, the memory in backend system 20 may contain different components for retrieving, presenting, changing, and saving data. This memory may include a variety of memory devices, for example, Dynamic Random Access Memory ("DRAM"), Static RAM ("SRAM"), flash memory, cache memory, and other memory devices.

Database 28 may include any type of data storage adapted to searching and retrieval. The database 28 may include a specific database such as HANA™, as pictured in FIG. 1, which may be an in-memory database, or other similar database system. The databases of backend system 20 may store business objects for retrieval by client device 10.

In an embodiment, any processor in backend system 20 may perform computation and control functions of a system and comprises a suitable central processing unit. This processor may comprise a single integrated circuit, such as a microprocessor, or may comprise any suitable number of integrated circuit devices or circuit boards working in cooperation to accomplish the functions of a processor.

In an embodiment the processor in backend system 20 may execute the NetWeaver™ application 22 or similar type application run on the server side to enable communication with client device 10. This application may be implemented using an advanced business application programming ("ABAP") system to access the stored business objects from the database 28.

Backend system 20 may also include user interface library 24 and visualization library 26. These libraries may represent java libraries that allow for the visualization of the business objects as nodes in the user interface of device 10.

Figure 2:
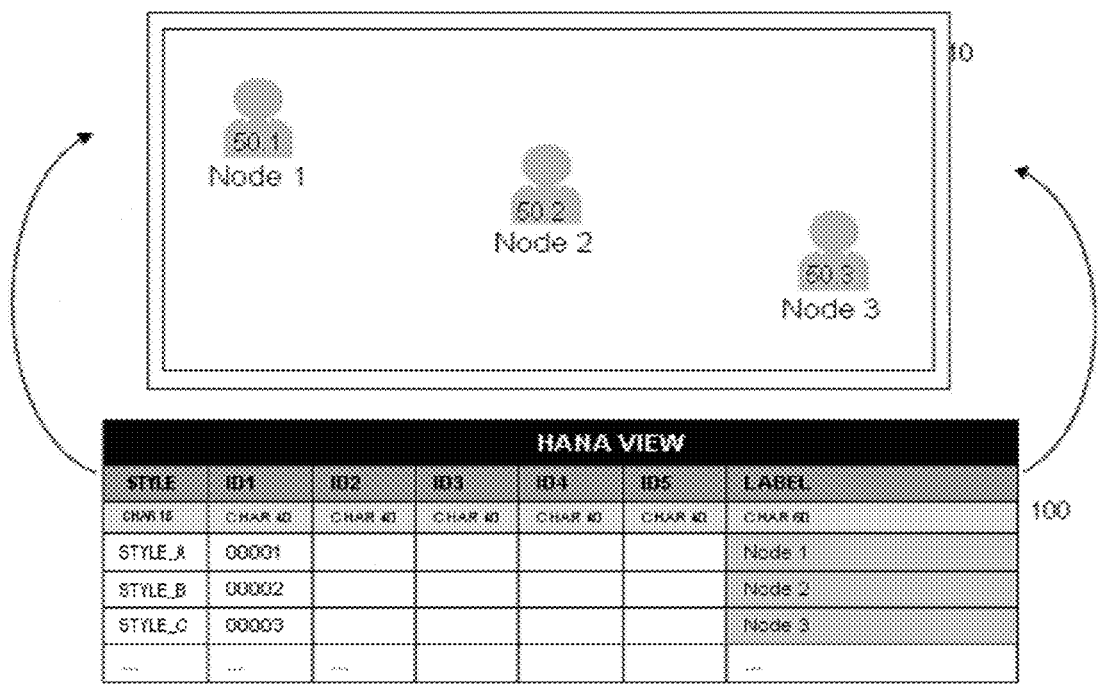
FIG. 2 is a diagram of the visual representation of the business objects in a user interface generated from a database model view of the business objects according to an embodiment.

FIG. 2 illustrates a visual representation of the business objects in a user interface generated from a database model view of the business objects. In an example embodiment, metadata of various business objects may be stored in database 28 on backend system 20. In an embodiment, the metadata of the business objects may be arranged in fields in table 100, which may be stored in database 28. Table 100 may represent a database model view, such as HANA, of the data objects stored in database 28, with each of the business objects listed as entries in the table. Table 100 may contain a number of fields which contain identifying information about each business object. In an embodiment, each entry in each row in table 100 may correspond to a separate business object. Each business object listed in table 100 may be generated as a node displayed in the user interface of device 10. For example, in the example embodiment of FIG. 2, the business object displayed in the first row in table 100 may correspond to a generated node, Node 1, displayed in the user interface of device 10. Node 1 may be represented by a graphical or pictorial representation 50.1 and a corresponding label ("Node 1"). In this embodiment, business object displayed in the second row in table 100 may correspond to a generated node, Node 2, also displayed in the user interface of device 10. Node 2 may be represented by a graphical or pictorial representation 50.2 and a corresponding label ("Node 2"). Device 10 may, in the example embodiment of FIG. 2, also display a third node, represented by graphical or pictorial representation 50.3, and a corresponding label ("Node 3"), which may correspond to another business object from table 100.

Table 100 representing a HANA view of the business objects stored in database 28 may include identifying fields that allow for identification of each node and business object by keys. In an embodiment, only a single key may be used for each node. In another embodiment, more than one key may be used to identify each node. In an embodiment, where not all the available key fields are used, any remaining key fields may be set to empty strings. In the example embodiment of FIG. 2, five key fields may be provided for each node. In the example embodiment of FIG. 2 where only a single key is used for each node, the four remaining keys for each node may be set to empty strings. In an embodiment, the node keys may be used to connect each of the nodes and navigate to other application objects. In an embodiment, the keys for each node may not be visually displayed in the user interface of device 10.

Table 100 may also include a label field listing the corresponding labels for each node. In an embodiment, the label of each node may be displayed along with the graphical or pictorial representation of each node, as depicted in FIG. 2. In an embodiment, the node label may correspond to an identifier for a particular node and may provide a description of the node. In another embodiment, the node label may provide additional numerical or textual data on the node, such as the number of contained entities on a node that represents a group of business objects.

Table 100 may also include a style field supplying the visual style of the node. The visual style of nodes may already be provided by the node type, whereupon entries in this column may then override the default style. In an embodiment, a default style may be used to display all nodes of a type in the same way, except for deviations that need a user's attention and thus shall be displayed differently. In another embodiment, this may be used to distinguish node appearance on the basis of the underlying business objects' data, such as, for example, depicting male and female business partners with different symbols.

Figure 3:
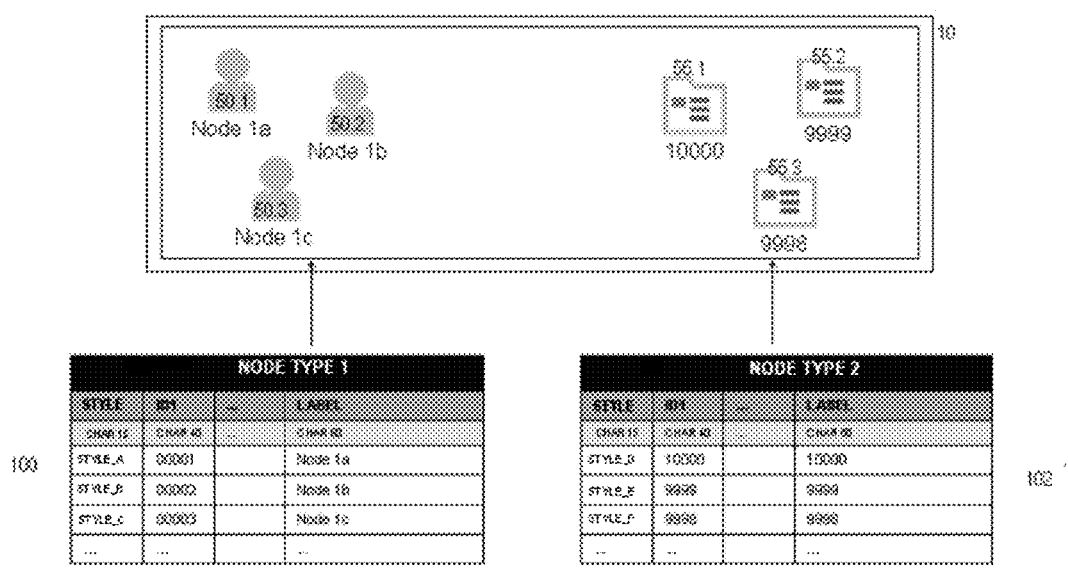
FIG. 3 is a diagram of a visual representation of the business objects of different node types generated from separate database model views being displayed in a user interface of a client device according to an embodiment.

As the metadata for each business object in the database may be classified into separate business object types, these objects may therefore provide separate and distinct node types. FIG. 3 illustrates a visual representation of the business objects of different node types generated from separate HANA views being displayed in a user interface of client device 10. Table 100 may list entries for business objects that have been classified by the same or similar business object type, and may represent a first HANA view corresponding to a first node type. Each of the listed business objects may have the same node type. The metadata for the business objects for Nodes 1a, 1b, and 1c may be listed in table 100. The visual representation of these nodes 50.1-50.3 may be displayed by a graphical or pictorial component along with the corresponding node label.

In contrast, table 102 may list entries for business objects that have been classified by a different business object type, and may represent a second HANA view corresponding to a second and distinct node type. Each of the listed business objects in table 102 may have the same node type. The metadata for the business objects the nodes having labels "10000", "9999", and "9998" may be listed in table 100. The visual representation of these nodes 55.1-55.3 may be displayed by a graphical or pictorial component along with the corresponding node label. In an embodiment, these nodes having a separate node type may have different graphical or pictorial representation than nodes 50.1-50.3. Theses nodes may be displayed along with their visual representation in the user interface in device 10.

In an embodiment, a user may adjust the node style that is displayed in the user interface in device 10. This may include, but is not restricted to, the size of the graphical or pictorial representation, the shape of the graphical or pictorial representation, and the type of graphical or pictorial representation used for the node. In an embodiment, a user may select default settings for the graphical representation of each node type. In another embodiment, the system may provide default settings for each node type. In an alternate embodiment, the database model views providing the data may override these default settings by providing different styles for specific nodes. Node styles may also specify whether the node type's description shall be displayed as a label at nodes of the type.

FIG. 4 illustrates the different model view types of the business objects that may be provided by database 28. The different HANA view types may be embodied in Tables 100.1-100.3. In table 100.1, the business object metadata may be provided in a graphical calculation view. In the graphical calculation view, the node label for the nodes may correspond to a description or identifier of the node. For example, as illustrated in FIG. 4, in table 100.1, these labels may correspond to "Node 1", "Node 2", and "Node 3". These labels may be displayed along with the graphical or pictorial representation of each node in the user interface of device 10.

Table 100.2 may illustrate an attribute view of the business object metadata. In the attribute view, the node label for the nodes may correspond simply to an attribute of the business object. In the example embodiment of FIG. 4, this may correspond to an identifying key of each node. For example, in table 100.2, these labels may correspond to "00001", "00002", and "00003", which also correspond to the identifying key for each of the nodes. These node labels may be displayed along with the graphical or pictorial representation of each node in the user interface of device 10.

In table 100.3, the business object metadata may be provided in a scripted calculation view, which may be similar to the graphical calculation view. In the scripted calculation view, the node label for the nodes may correspond to a description or identifier of the node, but the view also contains an additional input field which is used as a measure.

All of these HANA view types may be used to generate nodes for display in the user interface in device 10. In an embodiment, the graphical calculation view and the attribute view may be the default HANA view types.

As the metadata for each relation between business objects in the database may be classified into separate relationship types, these objects may therefore provide separate and distinct edge types. An edge type may specify the type of the nodes from which edges of a particular type start. This edge type also specify the type of the nodes that edges of the specific edge type terminate. Analogously to node types, edge types may provide a textual description that may be displayed as label at the edges of the type. Also analogously to node types, edge types may provide the visual style with that edges of the type are displayed.

Figure 5:
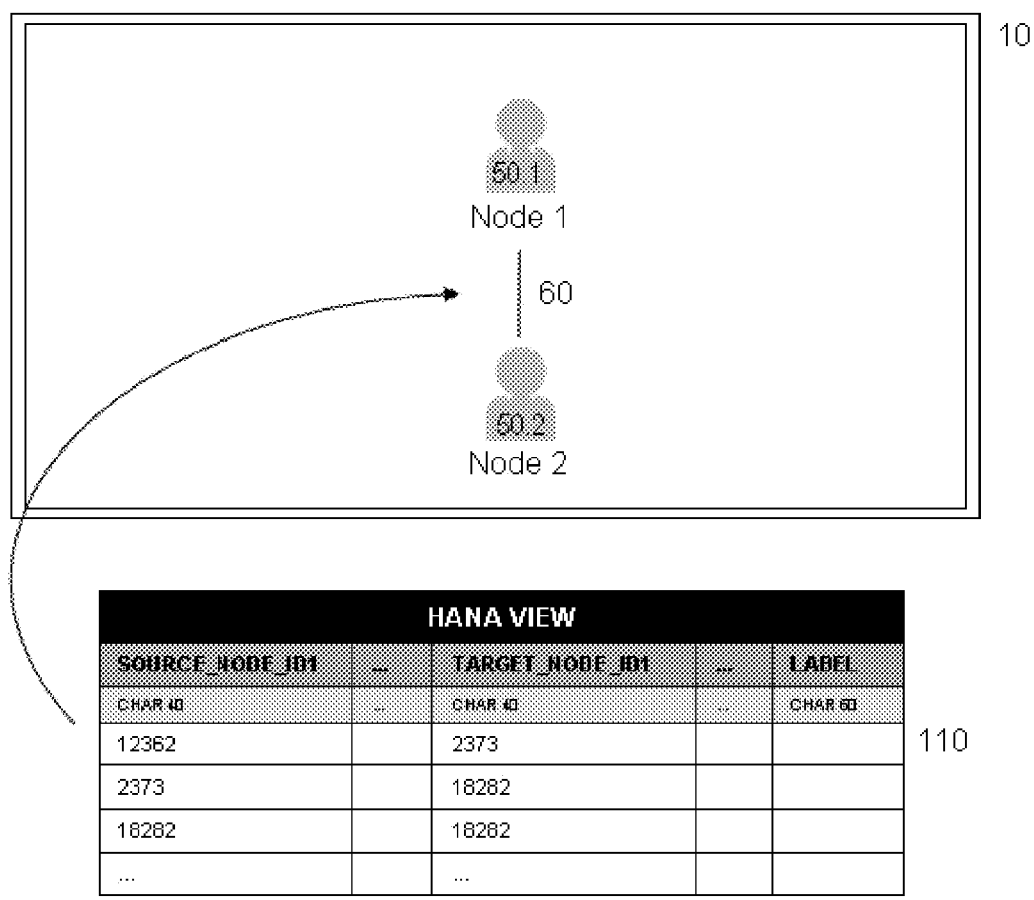
FIG. 5 is a diagram of the generation of edges from a database model view to connect nodes in the user interface of the client device according to an embodiment.

The relationship between nodes displayed in the user interface in device 10 may be defined by edges which may be depicted by, for example, connecting lines or arrows, as depicted in FIG. 5. FIG. 5 illustrates the generation of edges from a HANA view to connect nodes in the display in the user interface of device 10. As illustrated in FIG. 5, Node 1 and Node 2 may be displayed in the user interface of device 10, and represented by graphical representations 50.1 and 50.2. As further depicted in the embodiment of FIG. 5, edge marker 60 may be generated from a HANA view. Table 110 may represent a HANA view from which each edge is generated. Table 110 may be presented in a graphical calculation view, an attribute view, a scripted calculation view, or an analytical view.

Each row in table 110 may correspond to a separate edge that is generated for display in the user interface. Table 110 may include multiple fields providing information about each node. In an embodiment, table 110 may provide a field with the key of the source node of an edge 60. The source node input of an edge may refer to the node from which the edge 60 begins. In another embodiment, table 110 may provide multiple such key fields, the number corresponding to or outnumbering the number of key fields of the referenced node. In this embodiment, if the node does not use all available key fields, unused fields may be set to empty strings. Table 110 may include also include a field corresponding to the target node of an edge. The target node input of an edge may refer to the node in which edge 60 terminates. In an embodiment, table 110 may provide multiple such key fields, the number corresponding to or outnumbering the number of key fields of the referenced node. In this embodiment, if the node does not use all available key fields, unused fields may be set to empty strings.

Table 110 may also include an edge label field which may provide for a label for the edge when graphically displayed in the user interface. In an embodiment, the label may be combined with the label of the particular edge type. In another embodiment, these may be exclusive and the label may override the label of the edge type. As illustrated in FIG. 5, if no label is desired for the edge, this input field may be set to an empty string.

The visual properties of each edge 60 may be determined by a user or set by default parameters by the system. In an embodiment, a user may adjust the edge style that is displayed in the user interface in device 10. This may include, but is not restricted to, the size or thickness of the line or arrow representing the edge, the shape of the line or arrow depicting the edge, the color or gradient of the line, dash-dot patterns for intermitted lines, geometrical line curvature factors for non-straight lines, line length and elasticity factors for displays with flexible layout algorithms, and the direction of the line or arrow representing an edge. In an embodiment, lines may be depicted by <LINE> elements in a scalable vector graphics element <SVG> of the HTML5 standard, and edge styles may encompass the full attribute set available for the <LINE> element from the Cascading Style Sheet standard CSS3. In an embodiment, a user may select default settings for the representation of the edges. In another embodiment, the system may provide default settings of the edges. The edge style may also specify whether the edge type's descriptions shall be displayed as a label at edges of the edge type.

In an embodiment, all edges displayed in the user interface may be directed, since each edge is defined by a source node and a target node. In an embodiment, the direction of the edge 60 may be hidden as to present the edge as appearing to be undirected. In an alternate embodiment, the direction of the edge 60 may be enabled as to clearly delineate the source node and the target node of the edge. In this embodiment, edge 60 may appear to be an arrow. Enabling the visual representation of the direction of the edges may be set via a flag of the system.

FIGS. 6(a)-(d) illustrate example embodiments of the connectivity between nodes and generated edges as displayed on the user interface of device 10. In FIG. 6(a), two nodes of different node types may be connected by an edge. A first node, Node 1, belonging to a first node type, may be represented by graphical representation 50. A second node, 00001, belonging to a second node type, may be represented by a different graphical representation 55. Node 50 and node 55 may be connected by edge 60. Node 50 may represent a source node of the edge 60, and node 55 may represent a target node of the edge 60.

In FIG. 6(b), two nodes of different node types may again be connected by an edge. A first node, Node 1, belonging to a first node type, may be represented by graphical representation 50. A second node, Node 2, belonging to a second node type, may be represented by a different graphical representation 55. Node 50 and node 55 may be connected by edge 60. Node 50 may represent a source node of the edge 60, and node 55 may represent a target node of the edge 60. Edge 60 may be configured to show direction, visually being depicted in the user interface as an arrow. This configuration may occur by the setting of a flag in the system.

In FIG. 6(c), two nodes of the same node type may be connected by an edge. A first node, Node 1, may be represented by graphical representation 50.1. A second node, Node 2, belonging to same node type, may be represented by the same graphical representation 50.2. Node 50.1 and node 50.2 may be connected by edge 60. Node 50.1 may represent a source node of the edge 60, and node 50.2 may represent a target node of the edge 60.

In FIG. 6(d), only a single node may be depicted and connected to itself by an edge. A node, Node 1, may be represented by graphical representation 50. Node 50 may represent a source node and a target node of the edge 60, thereby creating the appearance in the user interface that the node is connected to itself.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for visually defining relationships between business objects stored in a backend system in a user interface of a device, the method being implemented by one or more data processors forming part of at least one computing device and comprising:
retrieving, by at least one data processor, the business objects stored in a database in the backend system, the business objects encapsulating data structures and having interfaces to facilitate data exchange among the business objects and having associated metadata characterizing the corresponding data structures, the metadata being stored in fields of a table in the database, the fields including, for each business object, a style field supplying visual styles of nodes;
sorting, by at least one data processor, metadata of the business objects into node types;
generating, by at least one data processor, nodes from database model views of the metadata of the business objects;
displaying, by at least one data processor, visual representations of the nodes in the user interface according to the visual styles specified in the style fields for the respective nodes;
generating, by at least one data processor, edges from other database model views, these other database model views identifying a source node for a start and a target node for a termination of each edge; and
displaying, by at least one data processor, visual representation of the edges in the user interface based on the source node and the target node of each edge.

2. The method according to claim 1, wherein each node includes at least one key to identify the node.

3. The method according to claim 1, wherein each node includes a node label in the database model view which is visually depicted in the user interface upon generation of the node.

4. The method according to claim 1, wherein separate database model views are used to generate nodes corresponding to different node types.

5. The method according to claim 1, wherein nodes of each node type have a distinct visual representation.

6. The method according to claim 1, wherein the database model views for the nodes are at least one of: a graphical calculation view, an attribute view, and a scripted calculation view.

7. The method according to claim 1, wherein the database model views for the edges are at least one of: a graphical calculation view, an attribute view, and a scripted calculation view.

8. The method according to claim 1, wherein the edge is a line or arrow that is straight or curved.

9. The method according to claim 8, wherein the line or arrow indicates directionality.

10. The method according to claim 1, wherein the source node and the target node are the same node type.

11. The method according to claim 1, wherein the source node and the target node are a different node type.

12. The method according to claim 1, wherein the source node and the target node are the same node.

13. The method of claim 1, further comprising: concurrently displaying, along with the visual representations of the nodes and the edges, a table comprising fields providing information about at least one of the nodes or the edges.

14. The method of claim 13, wherein the information provided in the table comprises an edge label field that specify, for each edge, a label.

15. The method of claim 14, wherein each edge type has a distinct representation.

16. A device having an application stored thereon to visually defining relationships between business objects stored in a backend system, the device comprising:
an arrangement performing the following:
retrieving the business objects stored in a database in the backend system, the business objects encapsulating data structures and having interfaces to facilitate data exchange among the business objects and having associated metadata characterizing the corresponding data structures, the metadata being stored in fields of a table in the database, the fields including, for each business object, a style field supplying visual styles of nodes;
sorting metadata of the business objects into node types;
generating nodes from a database model view of the metadata of the business objects;
displaying visual representations of the nodes in the user interface according to the visual styles specified in the style fields for the respective nodes;
generating edges from a second database model view, the second database model view identifying at least one source node for a start of each node and at least one target node for a termination of each node; and
displaying visual representation of the edges in the user interface based on the source node and the target node of each node.

17. The device according to claim 16, wherein each node includes at least one of a key to identify the node and a node label in the database model view which is visually depicted in the user interface upon generation of the node.

18. The device according to claim 16, wherein separate database model views are used to generate nodes corresponding to different node types.

19. A system for visually defining relationships between business objects stored in a backend system, the system comprising:
at least one backend server storing business objects;
a device executing an application for display on a user interface of the device, the application executed to:
retrieve the business objects stored in a database in the backend system, the business objects encapsulating data structures and having interfaces to facilitate data exchange among the business objects and having associated metadata characterizing the corresponding data structures, the metadata being stored in fields of a table in the database, the fields including, for each business object, a style field supplying visual styles of nodes;
sort metadata of the business objects into node types;
generate nodes from a database model view of the metadata of the business objects, the database model view implemented as a graphical calculation view, an attribute view, a scripted calculation view, or an analytical view, wherein separate database model views are used for different node types;

display visual representations of the nodes along with corresponding node labels in the user interface, each node type having a distinct representation according to the visual styles specified in the style fields for the respective nodes;

generate edges from a second database model view, the second database model view identifying at least one source node for a start of each node and at least one target node for a termination of each node, the source node and the target node corresponding to at least one of: a same node type, a different node type, the same node;

display visual representation of the edges in the user interface based on the source node and the target node of each node, each edge being depicted as a line or an arrow having its directionality enabled or hidden.

20. A method for visually defining relationships between business objects stored in a backend system in a user interface of a device, the method being implemented by one or more data processors forming part of at least one computing device and comprising:

retrieving, by at least one data processor, the business objects stored in a database in the backend system, the business objects encapsulating data structures and having interfaces to facilitate data exchange among the business objects and having associated metadata characterizing the corresponding data structures, the metadata being stored in fields of a table in the database, the fields including, for each business object, a style field supplying visual styles of nodes;

sorting, by at least one data processor, metadata of the business objects into node types;

generating, by at least one data processor, nodes from a database model view of the metadata of the business objects, the database model view implemented as a graphical calculation view, an attribute view, a scripted calculation view, or an analytical view, wherein separate database model views are used for different node types;

displaying, by at least one data processor, visual representations of the nodes along with corresponding node labels in the user interface, each node type having a distinct representation according to the visual styles specified in the style fields for the respective nodes when there are corresponding values in such style fields and according a default visual style when there are no corresponding values in such style fields;

generating, by at least one data processor, edges from a second database model view, the second database model view identifying at least one source node for a start of each node and at least one target node for a termination of each node, the source node and the target node corresponding to at least one of: a same node type, a different node type, the same node; and displaying, by at least one data processor, visual representation of the edges in the user interface based on the source node and the target node of each node, each edge being depicted as a line or an arrow having its directionality enabled or hidden.

* * * * *